United States Patent
Hasunuma

(10) Patent No.: US 11,733,118 B2
(45) Date of Patent: Aug. 22, 2023

(54) PRESSURE DETECTION DEVICE INCLUDING SUPPRESSING VARIATIONS

(71) Applicant: Surpass Industry Co., Ltd., Saitama (JP)

(72) Inventor: Masahiro Hasunuma, Saitama (JP)

(73) Assignee: SURPASS INDUSTRY CO., LTD., Saitama (JP)

( * ) Notice: Subject to any disclaimer, the term of this patent is extended or adjusted under 35 U.S.C. 154(b) by 0 days.

(21) Appl. No.: 17/655,968

(22) Filed: Mar. 22, 2022

(65) Prior Publication Data
US 2022/0307931 A1    Sep. 29, 2022

(30) Foreign Application Priority Data

Mar. 23, 2021   (JP) .................................. 2021-048867

(51) Int. Cl.
*G01L 19/00* (2006.01)
*G01L 7/02* (2006.01)
*G01L 7/08* (2006.01)

(52) U.S. Cl.
CPC ............ *G01L 19/003* (2013.01); *G01L 7/022* (2013.01); *G01L 7/082* (2013.01)

(58) Field of Classification Search
None
See application file for complete search history.

(56) References Cited

U.S. PATENT DOCUMENTS

| | | |
|---|---|---|
| 2016/0377499 A1 | 12/2016 | Imai et al. |
| 2017/0219396 A1* | 8/2017 | Imai ................... G01L 19/0046 |
| 2018/0038770 A1 | 2/2018 | Osawa et al. |

(Continued)

FOREIGN PATENT DOCUMENTS

| | | | |
|---|---|---|---|
| EP | 3203204 | * | 8/2017 |
| EP | 3203204 A2 | | 8/2017 |

(Continued)

OTHER PUBLICATIONS

European Search Report issued in European Application No. 22162906.6, dated Jul. 22, 2022.

(Continued)

*Primary Examiner* — Lisa M Caputo
*Assistant Examiner* — Nigel H Plumb
(74) *Attorney, Agent, or Firm* — Hamilton, Brook, Smith & Reynolds, P.C.

(57) ABSTRACT

Provided is a pressure detection device that can suppress variation in the pressure detection characteristics of a pressure detection unit from occurring due to individual differences in the shape of flow passage units, variation in work in mounting the flow passage unit on the pressure detection unit, or the like. The pressure detection device including: a pressure detection unit; a flow passage unit; and a mounting unit configured to removably mount the flow passage unit on the pressure detection unit. The pressure detection unit has a pressure detecting diaphragm and a sensor rod arranged at the center part of a first surface of the pressure detecting diaphragm. The flow passage unit has a flow passage diaphragm, and a displacement of the flow passage diaphragm in contact with the top surface is transmitted to the pressure detecting diaphragm via the sensor rod.

5 Claims, 14 Drawing Sheets

(56) References Cited

U.S. PATENT DOCUMENTS

2019/0011321 A1\* 1/2019 Kobayashi .......... G01L 19/0023
2019/0056280 A1\* 2/2019 Abo .................... G01L 19/0046
2022/0307930 A1 9/2022 Imai

FOREIGN PATENT DOCUMENTS

| EP | 344582 | \* | 2/2019 |
| EP | 3444582 A1 | | 2/2019 |
| JP | 2017009467 A | | 1/2017 |
| JP | 2019015568 A | | 1/2019 |

OTHER PUBLICATIONS

Extended European Search Report issued in European Application No. 22162905.8, dated Aug. 30, 2022.

\* cited by examiner

PRESSURE DETECTION DEVICE INCLUDING SUPPRESSING VARIATIONS

RELATED APPLICATION(S)

This application claims priority under 35 U.S.C. § 119 or 365 to Japanese Application No. 2021-048867, filed Mar. 23, 2021, the entire teachings of which are incorporated herein by reference.

BACKGROUND

1. Technical Field

The present disclosure relates to a pressure detection device.

2. Description of Related Art

A conventionally known pressure detection device includes a flow passage unit provided with a pressure transmitting surface formed on a part of a flow passage that allows liquid to flow therethrough, a pressure detection unit that detects pressure transmitted to a pressure detecting surface, and a mounting mechanism by which these units are removably mounted (see, for example, Japanese Unexamined Patent Application, Publication No. 2019-15568).

In the pressure detection device disclosed in Japanese Unexamined Patent Application, Publication No. 2019-15568, the flow passage unit is removably mounted on the pressure detection unit, and thus a used flow passage unit can be replaced with a new flow passage unit.

In the pressure detection device disclosed in Japanese Unexamined Patent Application, Publication No. 2019-15568, the flow passage unit is mounted on the pressure detection unit such that the entire region of the pressure transmitting surface of the flow passage unit is in direct contact with the pressure detecting surface of the pressure detection unit.

However, individual differences in the shape of flow passage units, variation in work in mounting the flow passage unit on the pressure detection unit, or the like may cause a state where a region of a part of the pressure transmitting surface is not in direct contact with the pressure detecting surface. Further, even when the entire region of the pressure transmitting surface is in direct contact with the pressure detecting surface, an unbalance may occur in the contact force therebetween. In such a case, the pressure detection characteristics of the pressure detection unit would change before and after the flow passage unit is replaced.

SUMMARY

The present disclosure has been made in view of such circumstances and intends to provide a pressure detection device that can suppress variation in the pressure detection characteristics of a pressure detection unit from occurring due to individual differences in the shape of flow passage units, variation in work in mounting the flow passage unit on the pressure detection unit, or the like.

To solve the problem described above, the present disclosure employs the following solutions.

A pressure detection device according to one aspect of the present disclosure includes: a pressure detection unit configured to detect a pressure of a fluid; a flow passage unit in which a flow passage through which the fluid flows is formed; and a mounting unit configured to removably mount the flow passage unit on the pressure detection unit. The pressure detection unit has a pressure detecting diaphragm configured to be displaced in accordance with a pressure transmitted from the flow passage unit and a pressure transmitting member joined to a center part of a first surface of the pressure detecting diaphragm, protruding toward the flow passage unit along a first axis orthogonal to the pressure detecting diaphragm, and having a top surface orthogonal to the first axis. The flow passage unit has a flow passage diaphragm configured to be displaced in accordance with a pressure of the fluid flowing through the flow passage, and a displacement of the flow passage diaphragm in contact with the top surface is transmitted to the pressure detecting diaphragm via the pressure transmitting member in a state where the flow passage unit is mounted on the pressure detection unit by the mounting unit.

According to the pressure detection device of one aspect of the present disclosure, since the flow passage unit is removably mounted on the pressure detection unit, when a fluid to be passed through the flow passage is changed, a used flow passage unit may be removed from the pressure detection unit, and an unused flow passage unit may be newly mounted on the pressure detection unit. Thus, when a fluid to be passed through the flow passage is changed, cleaning work for the flow passage that would otherwise take a long time is no longer required, and the speed of work can be increased. Further, since an unused flow passage unit can be newly used, safety can be enhanced.

Further, according to the pressure detection device of one aspect of the present disclosure, a displacement of the flow passage diaphragm in contact with the top surface of the pressure transmitting member arranged at the center part of the first surface of the pressure detecting diaphragm is transmitted to the pressure detecting diaphragm via the pressure transmitting member in a state where the flow passage unit has been mounted on the pressure detection unit by the mounting unit.

Since the region of the flow passage diaphragm in contact with the top surface of the pressure transmitting member is a part of the entire region of the flow passage diaphragm, the entire region of the top surface of the pressure transmitting member reliably comes into contact with the flow passage diaphragm even with individual differences in the shape of flow passage units or variation in work in mounting the flow passage unit on the pressure detection unit. It is therefore possible to suppress variation in the pressure detection characteristics of the pressure detection unit from occurring due to individual differences in the shape of flow passage units, variation in work in mounting the flow passage unit on the pressure detection unit, or the like.

Further, according to the pressure detection device of one aspect of the present disclosure, since the pressure detection unit has the pressure transmitting member arranged at the center part of the first surface of the pressure detecting diaphragm, the shape of the pressure transmitting member does not change even after the flow passage unit is replaced. It is therefore possible to prevent variation of the pressure detection characteristics due to individual differences in the shape of the pressure transmitting member compared to a case where the pressure transmitting member is provided to the flow passage unit.

Herein, the variation of the pressure detection characteristics means that, for example, when external force is applied to the pressure detection device, there is a difference between a pressure detection value before the external force is applied and a pressure detection value after the external force is applied even when the fluid pressure is constant. Further, the variation of the pressure detection characteristics means that, for example, there is a difference between a pressure detection value in a state where the fluid pressure is gradually increasing and a pressure detection value in a state where the fluid pressure is gradually decreasing even with the same fluid pressure.

The pressure detection device according to one aspect of the present disclosure is preferably configured such that the pressure detection unit has a sensor body having the pressure detecting diaphragm, the pressure transmitting member, and a base part to which the pressure detecting diaphragm is attached, and a housing member configured to house the sensor body and, in a state where a first region including the center part of the pressure detecting diaphragm is exposed, come into contact with a second region located on the outer circumference side of the first region, the housing member has a contact surface in contact with an end region of the flow passage diaphragm in a state where the flow passage unit is mounted on the pressure detection unit by the mounting unit, and a first length along the first axis from the first surface to the top surface is 1.0 time or greater and 1.3 times or less of a second length along the first axis from the first surface to the contact surface.

According to the pressure detection device of the configuration described above, the first length along the first axis from the first surface of the pressure detecting diaphragm to the top surface of the pressure transmitting member is 1.0 time or greater of the second length from the first surface to the contact surface of the housing member. Thus, the top surface of the pressure transmitting member is arranged at the same position as the contact surface of the housing member or at a position protruding therefrom to the flow passage diaphragm, and the entire region of the top surface can be in reliably contact with the flow passage diaphragm.

According to the pressure detection device of the configuration described above, the first length along the first axis from the first surface of the pressure detecting diaphragm to the top surface of the pressure transmitting member is 1.3 times or less of the second length from the first surface to the contact surface of the housing member. This suppresses the top surface of the pressure transmitting member from excessively protruding to the flow passage diaphragm from the contact surface of the housing member, and it is possible to prevent variation of the pressure detection characteristics due to excessive deformation of the flow passage diaphragm.

The pressure detection device of the configuration described above is preferably configured such that the pressure detection unit has four distortion resistor units joined to a second surface of the pressure detecting diaphragm and connected to form a Wheatstone bridge circuit, and the four distortion resistor units are joined to a region of the second surface except for the center part.

Further, according to the pressure detection device of the configuration described above, four distortion resistor units are joined to a region except for the center part of the second surface of the pressure detecting diaphragm. It is therefore possible to suppress a reduction in the pressure detection accuracy compared to a case where the distortion resistor unit is arranged at the center part of the pressure detecting diaphragm whose displacement is suppressed because the pressure transmitting member is arranged.

The pressure detection device according to one aspect of the present disclosure is preferably configured such that the flow passage unit has a cylindrical communication hole extending along a second axis orthogonal to the flow passage and communicating with the flow passage, the communication hole is closed by the flow passage diaphragm, and the outer diameter (D1) of the pressure transmitting member is 0.2 times or greater and 0.6 times or less of the inner diameter (D2) of the communication hole.

According to the pressure detection device of the configuration described above, the outer diameter of the pressure transmitting member is 0.2 times or greater of the inner diameter of the communication hole of the flow passage unit. It is therefore possible to sufficiently secure the outer diameter of the pressure transmitting member relative to the inner diameter of the communication hole and reliably transmit a pressure change of a fluid flowing through the flow passage to the pressure detecting diaphragm.

Further, according to the pressure detection device of the configuration described above, the outer diameter of the pressure transmitting member is 0.6 times or less of the inner diameter of the communication hole of the flow passage unit. Thus, even with individual differences in the shape of flow passage units or variation in work in mounting the flow passage unit on the pressure detection unit, the entire region of the top surface of the pressure transmitting member can be in reliably contact with the flow passage diaphragm.

The pressure detection device according to one aspect of the present disclosure is preferably configured such that the base part has a cylindrical opening hole extending along the first axis, the opening hole is closed by the pressure detecting diaphragm, and the outer diameter of the pressure transmitting member is 0.2 times or greater and 0.5 times or less of the inner diameter of the opening hole.

According to the pressure detection device of the configuration described above, the outer diameter of the pressure transmitting member is 0.2 times or greater of the inner diameter of the opening hole of the base part. It is therefore possible to sufficiently secure the outer diameter of the pressure transmitting member relative to the inner diameter of the opening hole and reliably displace the pressure detecting diaphragm in accordance with the pressure transmitted from the pressure transmitting member.

Further, according to the pressure detection device of the configuration described above, the outer diameter of the pressure transmitting member is 0.5 times or less of the inner diameter of the opening hole of the base part. It is therefore possible to sufficiently secure the region of the pressure detecting diaphragm where the pressure transmitting member is not arranged and sufficiently secure the displacement of the pressure detecting diaphragm.

The pressure detection device according to one aspect of the present disclosure is preferably configured such that the pressure detection unit has a urging unit configured to generate urging force to urge the pressure detecting diaphragm to the flow passage diaphragm along the first axis, and the mounting unit mounts the flow passage unit on the pressure detection unit in a state where the top surface of the pressure transmitting member is in contact with the flow passage diaphragm under the urging force generated by the urging unit.

According to the pressure detection device of the configuration described above, the mounting unit mounts the flow passage unit on the pressure detection unit in a state where the top surface of the pressure transmitting member is in contact with the flow passage diaphragm under the urging force generated by the urging unit. Since the top surface of the pressure transmitting member is in contact with the flow passage diaphragm under the urging force generated by the urging unit, the strength of force with which the top surface contacts the flow passage diaphragm becomes constant, and it is possible to prevent variation of the pressure detection characteristics provided by the pressure detection unit.

According to the present disclosure, it is possible to provide a pressure detection device that can suppress variation in the pressure detection characteristics of a pressure detection unit from occurring due to individual differences in the shape of flow passage units, variation in work in mounting the flow passage unit on the pressure detection unit, or the like.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

With reference to the drawings, a pressure detection device 100 according to an embodiment of the present disclosure is described below.

Figure 1:
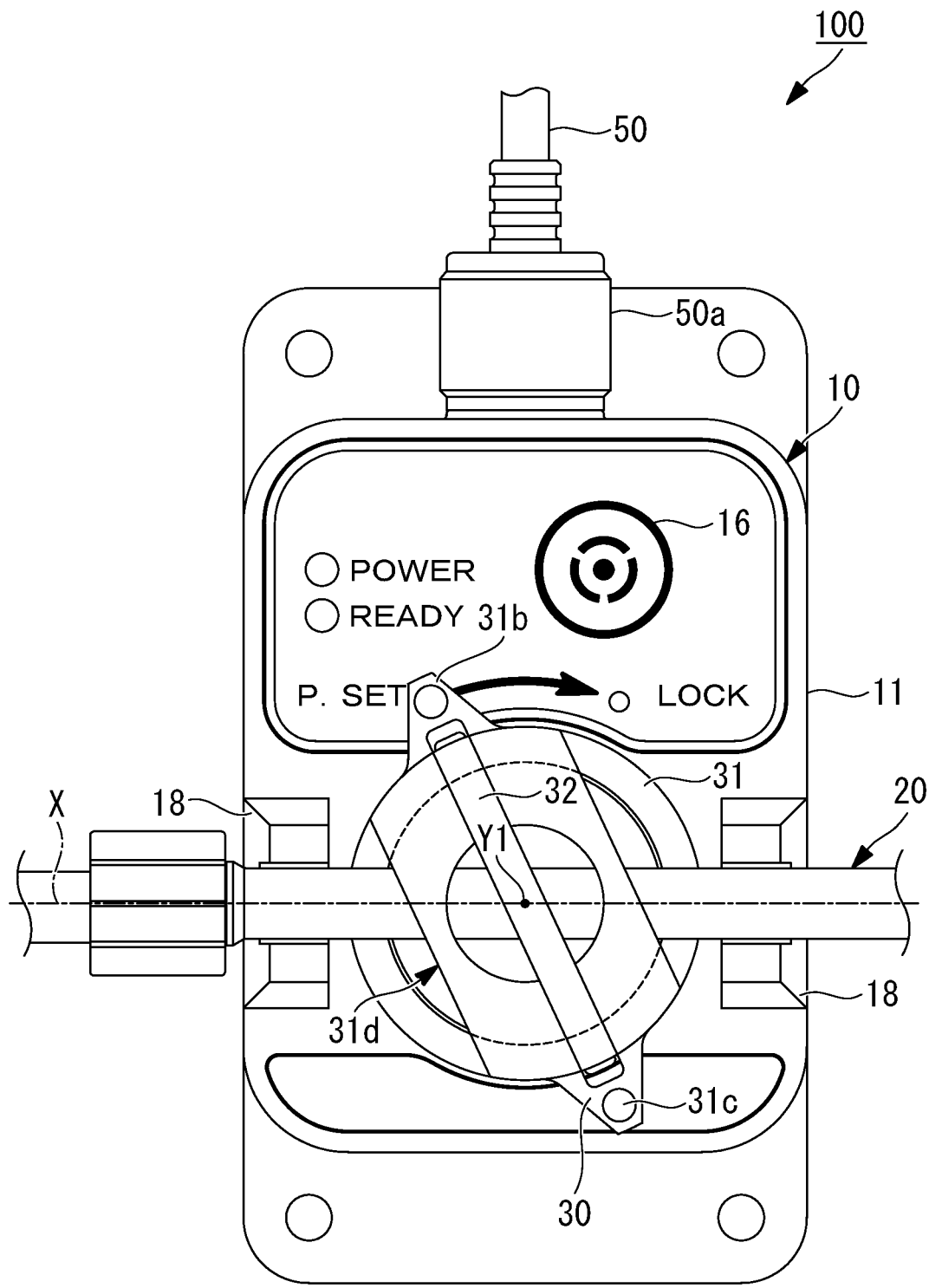
FIG. 1 is a plan view illustrating a pressure detection device of one embodiment of the present disclosure.
Figure 2:
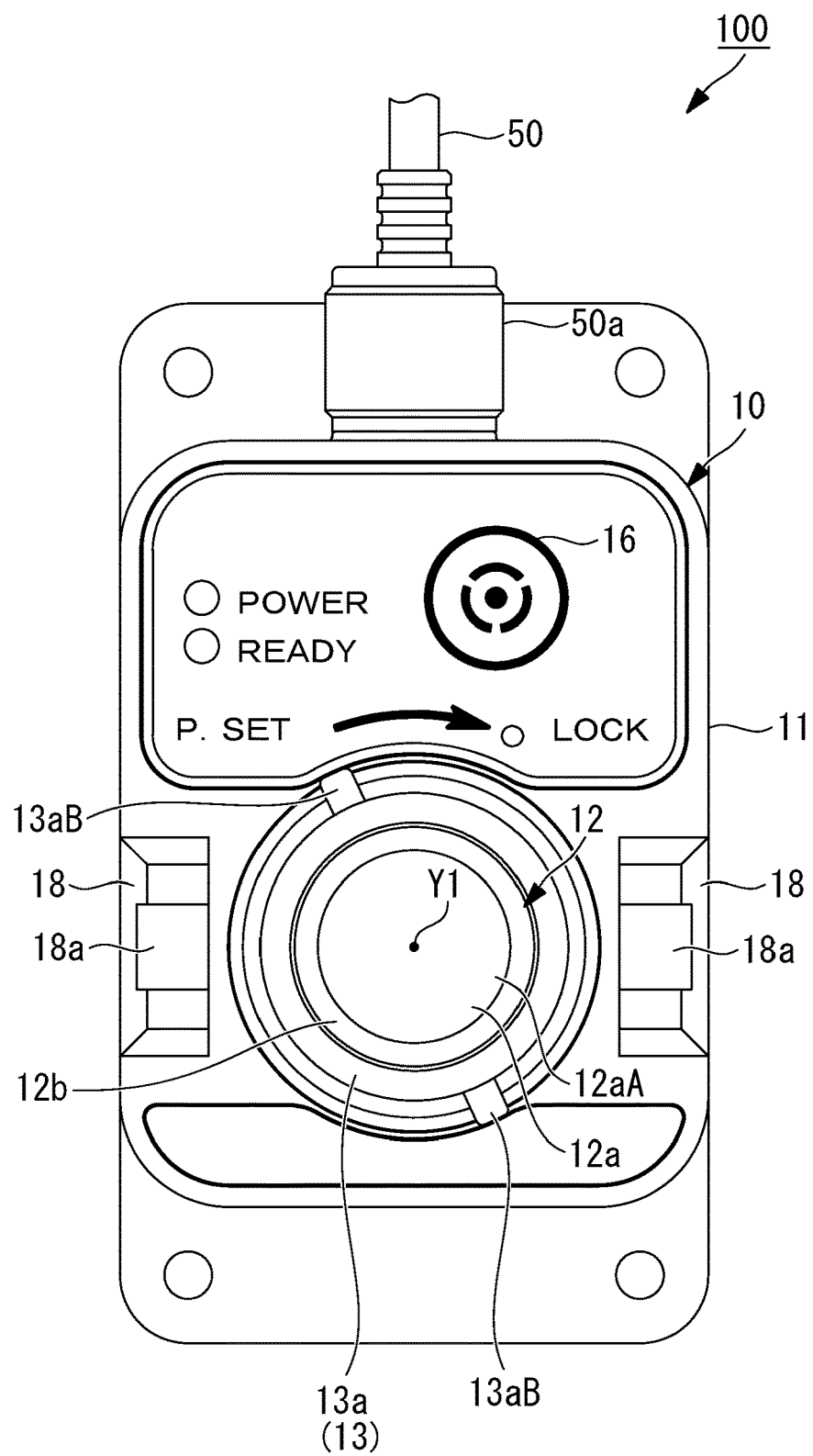
FIG. 2 is a plan view illustrating a state where a flow passage unit has been removed from the pressure detection device illustrated in FIG. 1.

As shown in FIG. 1 and FIG. 2, the pressure detection device 100 according to this embodiment includes a pressure detection unit 10, a flow passage unit 20, and a mounting unit 30. The pressure detection unit 10 is mounted on an installation surface S (see FIG. 3) by fastening bolts (not shown). The flow passage unit 20 includes a flow passage 21 formed therein to allow liquid (fluid) to flow through the flow passage 21 along a straight-line flow direction from an inflow port 21a to an outflow port 21b. The mounting unit 30 allows the flow passage unit 20 to be removably mounted on the pressure detection unit 10.

In the pressure detection device 100 according to this embodiment, the flow passage unit 20 is mounted on the pressure detection unit 10 by the mounting unit 30. The pressure detection device 100 is mounted on the installation surface S in a state where the flow passage unit 20 is mounted integrally on the pressure detection unit 10 by the mounting unit 30.

Figure 3:
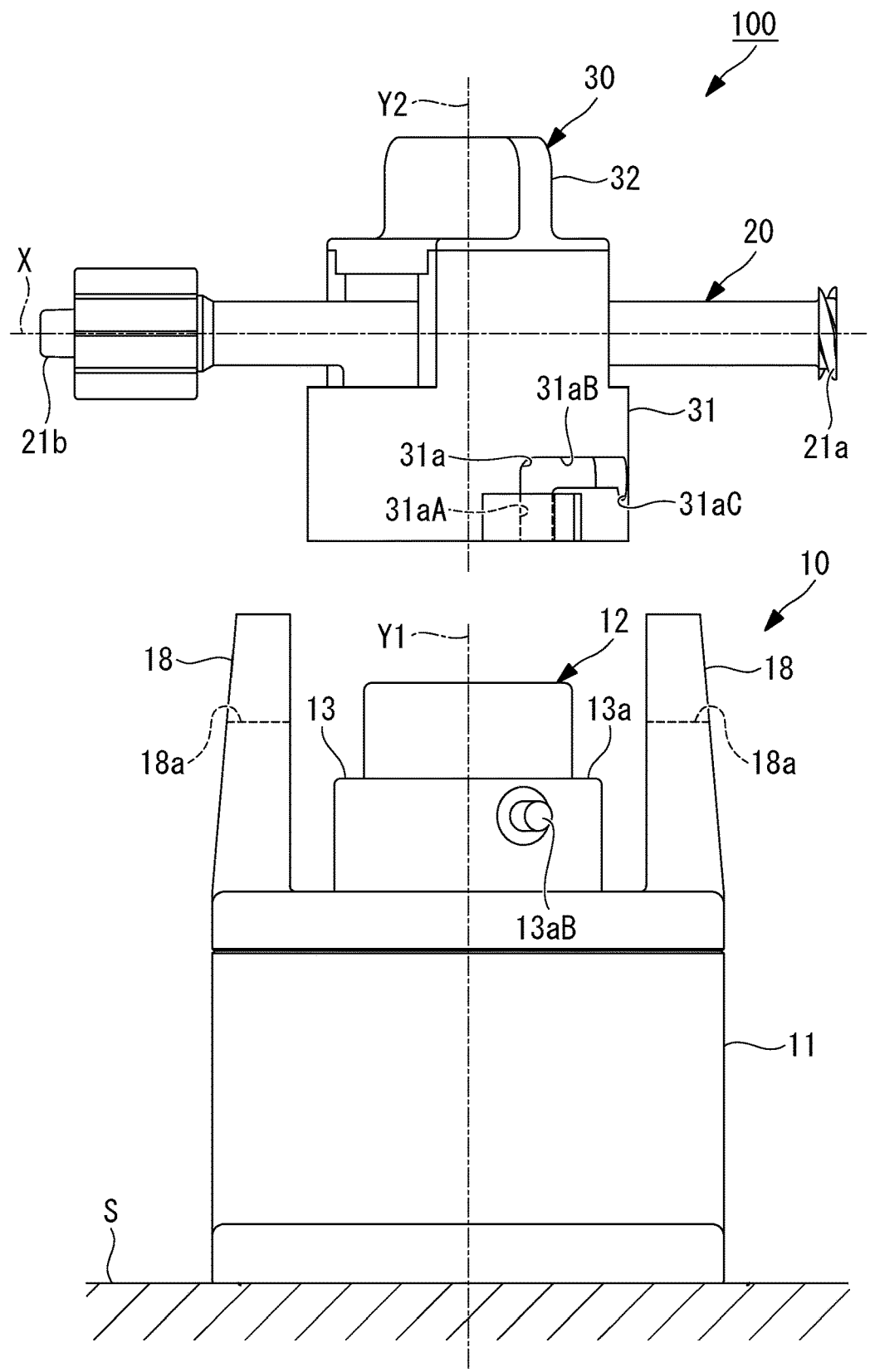
FIG. 3 is a front view illustrating a state where the flow passage unit has been removed from a pressure detection unit illustrated in FIG. 1.

As shown in FIG. 3, the inflow port 21a of the flow passage unit 20 is attached to an inflow pipe (not shown) that allows fluid to flow in the inflow port 21a. The outflow port 21b of the flow passage unit 20 is attached to an outflow pipe (not shown) that allows fluid flowing out from the outflow port 21b to flow therethrough. The pressure detection unit 10 detects pressure of fluid flowing through the flow passage 21 from the inflow port 21a to the outflow port 21b. In this embodiment, fluid means liquid such as blood or a dialysate.

As shown in FIG. 3, the pressure detection unit 10 includes a body 11 mounted on the installation surface S. As shown in FIG. 1 and FIG. 2, on the body 11 of the pressure detection unit 10, a cable 50 is mounted via a cable mounting nut 50a. The cable 50 electrically connects a sensor unit 12 arranged in the body 11 to a control device (not shown) arranged outside the body 11.

Figure 4:
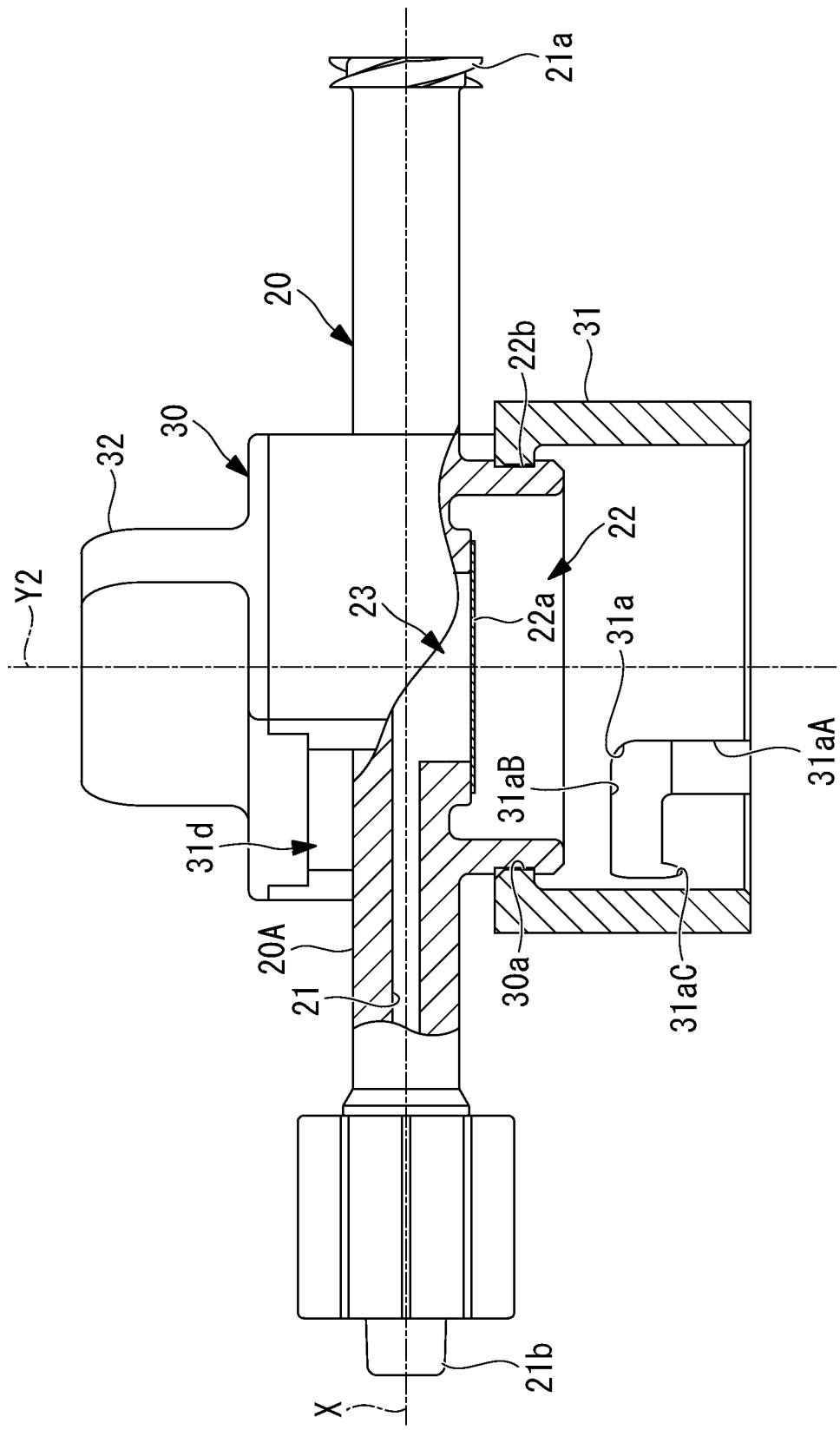
FIG. 4 is a partial sectional view of the flow passage unit illustrated in FIG. 3 and a mounting unit.
Figure 5:
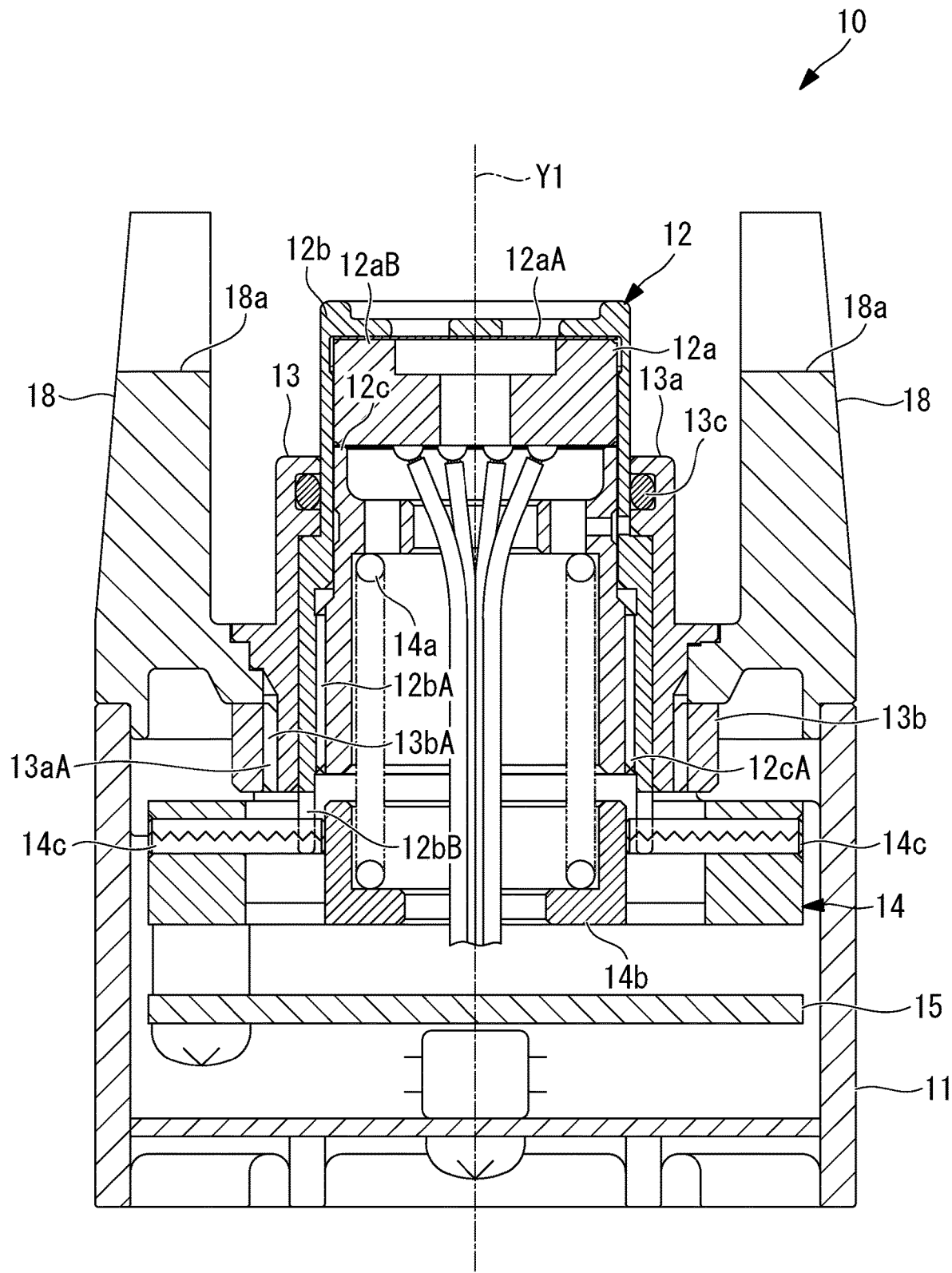
FIG. 5 is a longitudinal sectional view of the pressure detection unit illustrated in FIG. 3.

Next, the pressure detection unit 10 will be described in detail with reference to FIG. 1 to FIG. 5. The pressure detection unit 10 illustrated in FIG. 1 to FIG. 5 is a device that detects the pressure of a fluid transferred to a pressure detecting diaphragm 12aA. FIG. 3 is a front view illustrating a state where the flow passage unit 20 has been removed from a pressure detection unit 10 illustrated in FIG. 1. FIG. 4 illustrates a partial cross section of the flow passage unit 20 and the mounting unit 30 illustrated in FIG. 3. FIG. 5 is a longitudinal sectional view of the pressure detection unit 10 illustrated in FIG. 3.

As illustrated in FIG. 5, the pressure detection unit 10 has a body 11, a sensor unit 12, a holding unit 13, a urging unit 14, a sensor board 15, a zero-point adjusting switch 16 (see FIG. 1), and a guide member (guide part) 18.

As illustrated in FIG. 5, the sensor unit 12 has a sensor body 12a, a housing member 12b, and a support member 12c. The sensor body 12a has the pressure detecting surface 12aA to which a distortion resistor is attached, a base part 12aB to which the pressure detecting diaphragm 12aA is attached, and a sensor rod (pressure transmitting member) 12aC. The sensor body 12a is a distortion type sensor that outputs a pressure signal in accordance with a change in the resistance of a distortion resistor that deforms together with the pressure detecting diaphragm 12aA in accordance with a transmitted pressure.

An opening hole 12aB1 (see FIG. 11) that communicates with the pressure detecting diaphragm 12aA and that is closed by the pressure detecting diaphragm 12A is formed in the base part 12aB. A second surface 12aA2 of the pressure detecting diaphragm 12aA is maintained at an atmospheric pressure. Thus, the sensor body 12a serves as a sensor that detects a gauge pressure based on the atmospheric pressure as a reference. The pressure detecting diaphragm 12aA is formed in a thin film with an anti-corrosion material (for example, sapphire). The pressure detecting diaphragm 12aA is displaced in accordance with a pressure transmitted from the flow passage unit 20 via the sensor rod 12aC.

As illustrated in FIG. 5, the housing member 12b extends along the first axis Y1 and is formed in a cylindrical shape, which is a member to house the sensor body 12a therein. An internal thread 12bA is formed in the inner circumferential surface of the housing member 12b. The internal thread 12bA engages with an external thread 12cA formed on the outer circumferential surface of the support member 12c.

Two slits 12bB formed circumferentially in two portions and opened to the lower end are formed around the lower end of the housing member 12b. Each slit 12bB is inserted in a detent pin 14c that prevents the sensor unit 12 from rotating about the axis Y together with the mounting unit 30 when the operator rotates the mounting unit 30 about the axis Y.

As illustrated in FIG. 5, the support member 12c extends along the first axis Y1 and is formed in a cylindrical shape, which is a member to support the sensor body 12a inside the housing member 12b. The external thread 12cA is formed on the outer circumferential surface of the support member 12c. The sensor body 12a is fixed inside the housing member 12b by inserting the sensor body 12a in the housing member 12b and screwing and fastening the external thread 12cA of the support member 12c into the internal thread 12bA of the housing member 12b.

The holding unit 13 is a member extending along the first axis Y1 and formed in a cylindrical shape, which is a member to hold the sensor unit 12 movably along the first axis Y1 orthogonal to the pressure detecting diaphragm 12aA. The holding unit 13 has a body 13a, a fixing member 13b, and an O-ring 13c. The O-ring 13c in contact with the outer circumferential surface of the housing member 12b of the sensor unit 12 is attached to the inner circumferential surface of the body 13a.

An external thread 13aA is formed in the outer circumferential surface of the lower end of the body 13a, and an internal thread 13bA is formed on the inner circumferential surface of the fixing member 13b. The body 13a is fixed to the guide member 18 mounted on the body 11 by screwing and fastening the internal thread 13bA of the fixing member 13b onto the external thread 13aA of the body 13a.

The urging unit (pushing unit) 14 generates urging force to urge the sensor unit 12 against the flow passage diaphragm 22a of the flow passage unit 20. The urging unit 14 has a spring 14a, a base member 14b, and a detent pin 14c. The spring 14a is arranged with one end thereof being in contact with the base member 14b fixed to the body 11 and the other end being in contact with the support member 12c of the sensor unit 12. The spring 14a generates urging force in accordance with the distance along the first axis Y1 from one end, which is in contact with the base member 14b, to the other end.

The detent pin 14c is a member extending in a direction orthogonal to the first axis Y1 and formed in a shaft and is fixed to the base member 14b. The detent pin 14c is inserted in the pair of slits 12bB formed in the lower end of the housing member 12b. The detent pin 14c prevents the sensor unit 12 from rotating about the first axis Y1 together with the mounting unit 30 when the operator rotates the mounting unit 30 about the first axis Y1.

The sensor board 15 includes an amplifier circuit (not shown) that amplifies a pressure signal output from the sensor body 12a, an interface circuit that transmits the pressure signal amplified by the amplifier circuit to a pressure signal line (not shown) of the cable 50, a power supply circuit (not shown) that transmits a power supply voltage supplied from outside via the cable 50 to the sensor body 12a, a zero-point adjustment circuit (not shown) that performs a zero-point adjustment when the zero-point adjustment switch 16 is pressed. The zero-point adjustment circuit performs an adjustment such that, at the time when the zero-point adjustment switch 16 is pressed, a pressure signal output from the sensor body 12a is set as a reference value (for example, zero).

As illustrated in FIG. 3 and FIG. 5, the sensor unit 12 and the holding unit 13 of the pressure detection unit 10 protrude upward along the first axis Y1 out of the body 11 with the pressure detecting diaphragm 12aA being arranged at the top. As illustrated in FIG. 2 and FIG. 3, the holding unit 13 has a pair of protrusions 13aB protruding in a direction orthogonal to the first axis Y1 from the outer circumferential surface of the body 13a.

As illustrated in FIG. 2, the protrusions 13aB formed on the outer circumferential surface of the holding unit 13 are formed in two portions spaced apart from each other by 180 degrees about the axis Y. As illustrated in FIG. 2, when the flow passage unit 20 is not mounted on the pressure detection unit 10, the pressure detecting diaphragm 12aA of the sensor unit 12 is exposed to outside.

Guide members 18 include grooves 18a that guide the flow passage 21 to a predetermined mounting position when the flow passage unit 10 is mounted on the pressure detection unit 10. The guide members 18 are provided in pairs symmetrically on the first axis Y1. The respective guide members 18 in pairs guide a part of the flow passage 21 on the side of the inflow port 21a and a part of the flow passage 21 on the side of the outflow port 21b to the predetermined mounting position.

Next, with reference to FIGS. 1, 3 and 4, the flow passage unit 20 is described in detail.

As shown in FIG. 4, the flow passage unit 20 includes a flow passage body 20A formed with the flow passage 21, the recess 22, and a communication hole 23. The flow passage 21 allows fluid to flow therethrough in a flow direction extending along the axis X from the inflow port 21a to the outflow port 21b. The recess 22 includes the flow passage diaphragm 22a arranged on the bottom thereof. The communication hole 23 extends cylindrically in a direction along a second axis Y2 orthogonal to the axis X. The communication hole 23 is communicated with the flow passage 21.

The flow passage diaphragm 22a is a diaphragm formed in a thin film shape and formed of a material (for example, polycarbonate (PC)) having corrosion resistance. The flow passage diaphragm 22a is formed in a circular shape in a planar view and is centered at the second axis Y2. An outer peripheral edge of the flow passage diaphragm 22a is joined to the flow passage body 20A by bonding or welding so as to close the communication hole 23. Consequently, fluid introduced to the flow passage 21 does not flow out of the flow passage 21. Since the flow passage diaphragm 22a is formed in a thin film shape, the pressure transmitting surface 22a is displaced along the first axis Y1 by pressure of fluid introduced into the flow passage 21.

In a state shown in FIG. 3 where the flow passage unit 20 has been detached from the pressure detection unit 10, the flow passage diaphragm 22a of the flow passage unit 20 is spaced apart from the sensor rod 12aC of the pressure detection unit 10. On the other hand, in a state shown in FIG. 10, describe later, where the flow passage unit 20 has been mounted on the pressure detection unit 10, the flow passage diaphragm 22a of the flow passage unit 20 is in contact with the sensor rod 12aC of the pressure detection unit 10. Thus, the flow passage diaphragm 22a transmits pressure of fluid flowing through the flow passage 21 to the sensor rod 12aC.

In a state shown in FIG. 4 where the flow passage unit 20 is not mounted on the pressure detection unit 10, the flow passage diaphragm 22a is exposed to the outside. Nevertheless, an operator has a less risk of touching the flow passage diaphragm 22a, since the flow passage diaphragm 22a is arranged on the bottom of the recess 22.

As shown in FIG. 4, on an outer peripheral surface of the recess 22 of the flow passage unit 20, an endless annular groove 22b is formed to extend about the second axis Y2. On an inner peripheral surface of the mounting unit 30, an endless annular protrusion 30a is formed to extend about the second axis Y2. The mounting unit 30 is formed of an elastically deformable material (for example, a resin material). When the mounting unit 30 is pressed toward the annular groove 22b formed on the outer peripheral surface of the recess 22, the annular protrusion 30a is engaged with the annular groove 22b.

In a state shown in FIG. 4 where the annular protrusion 30a is engaged with the annular groove 22b, a minute gap is formed between an outer peripheral surface of the annular protrusion 30a and an inner peripheral surface of the annular groove 22b. Accordingly, the mounting unit 30, which is mounted on the flow passage unit 20, is rotatable about the second axis Y2 relative to the sensor unit 12 and the holding unit 13. This enables an operator to rotate the mounting unit 30 about the second axis Y2 in a state where the pressure detection unit 10 is fixed to the installation surface S.

As illustrated in FIG. 3, the mounting unit 30 is a member extending along the second axis Y2 and formed in a cylindrical shape and has a connecting member 31 and a knob 32. The mounting unit 30 is mounted on the flow passage unit 20 rotatably about the second axis Y2. As illustrated in FIG. 3 and FIG. 4, the connecting member 31 has the groove 31a that accepts a protrusion 13aB protruding out of the body 13a of the holding unit 13.

The groove 31a has a first groove 31aA extending along the second axis Y2 and opened at the lower end and a second groove 31aB connected to the upper end of the first groove 31aA and extending circumferentially about the axis Y. The second groove 31aB has the recess 31aC formed in a shape corresponding to the outer circumferential surface of the protrusion 13aB at the other end on the circumferentially opposite side of one end connected to the first groove 31aA. The second groove 31aB is formed circumferentially in a range less than one turn about the axis Y from one end connected to the first groove 31aA to the other end in which the recess 31aC is formed. This range is desirably a range of ¼ turns or less (a range of rotation angle of 45 degrees or less), for example.

A housing hole 31d used for housing the flow passage body 20A of the flow passage unit 20 is formed in the connecting member 31. The housing hole 31d is formed circumferentially with a predetermined opening width so that the flow passage body 20A is rotatable about the second axis Y2 with respect to the connecting member 31. After the flow passage unit 20 is installed in the housing hole 31d of the connecting member 31, the knob 32 is mounted on the upper end of the connecting member 31, and thereby the flow passage unit 20 is housed in the housing hole 31d.

The knob 32 is a member that extends in the direction orthogonal to the second axis Y2 and enables the operator to apply, in the direction along the second axis Y2, pressing force against urging force generated by the urging unit 14. Further, the knob 32 is a member that enables the operator to apply force to rotate the mounting unit 30 circumferentially about the second axis Y2.

Next, an operation to mount the flow passage unit 20 on the pressure detection unit 10 will be described.

The operator may work in the following procedure when mounting the flow passage unit 20 on the pressure detection unit 10 mounted on the installation surface S.

First, as illustrated in FIG. 3, the first axis Y1 of the pressure detection unit 10 and the second axis Y2 of the flow passage unit 20 are matched, and the flow passage unit 20 is arranged such that the circumferential position about the first axis Y1 of the protrusion 13aB of the pressure detection unit 10 and the circumferential position about the second axis Y2 of the first groove 31aA of the mounting unit 30 are matched.

Next, the operator moves the flow passage unit 20 downward along the second axis Y2 while maintaining the state illustrated in FIG. 3 and inserts the sensor unit 12 of the pressure detection unit 10 in the recess 22 of the flow passage unit 20. Once the sensor unit 12 is inserted in the recess 22, the sensor rod 12aC of the sensor unit 12 is in contact with the flow passage diaphragm 22a of the flow passage unit 20.

Figure 6:
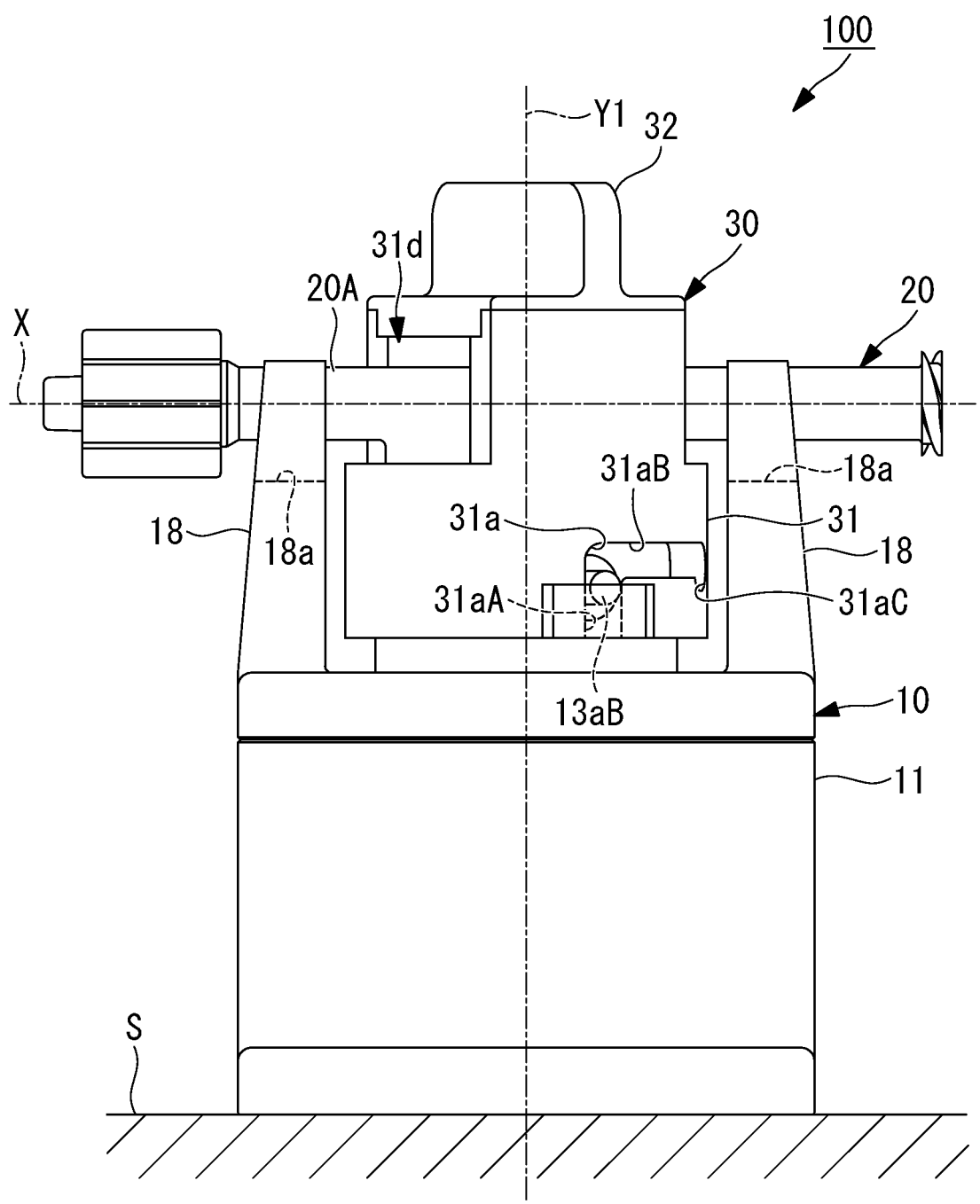
FIG. 6 is a front view of the pressure detection device illustrated in FIG. 1.

As illustrated in FIG. 6, the protrusion 13aB of the pressure detection unit 10 has been inserted in the first groove 31aA of the mounting unit 30 with the sensor rod 12aC being in contact with the flow passage diaphragm 22a. In a state where the operator does not apply pressing force to press the knob 32 downward, the urging unit 14 generates urging force to support the weight of the mounting unit 30 and the flow passage unit 20.

Next, the operator applies pressing force to press the mounting unit 30 downward while gripping the knob 32 in the state illustrated in FIG. 6. Once the downward pressing force is applied to the mounting unit 30, the spring 14a of the urging unit 14 contracts, and the protrusion 13aB of the pressure detection unit 10 reaches the upper end of the first groove 31aA. The operator rotates the knob 32 clockwise circumferentially about the axis Y in a state where the protrusion 13aB has reached the upper end of the first groove 31aA and inserts the protrusion 13aB in the second groove 31aB into a state illustrated in FIG. 7.

Figure 7:
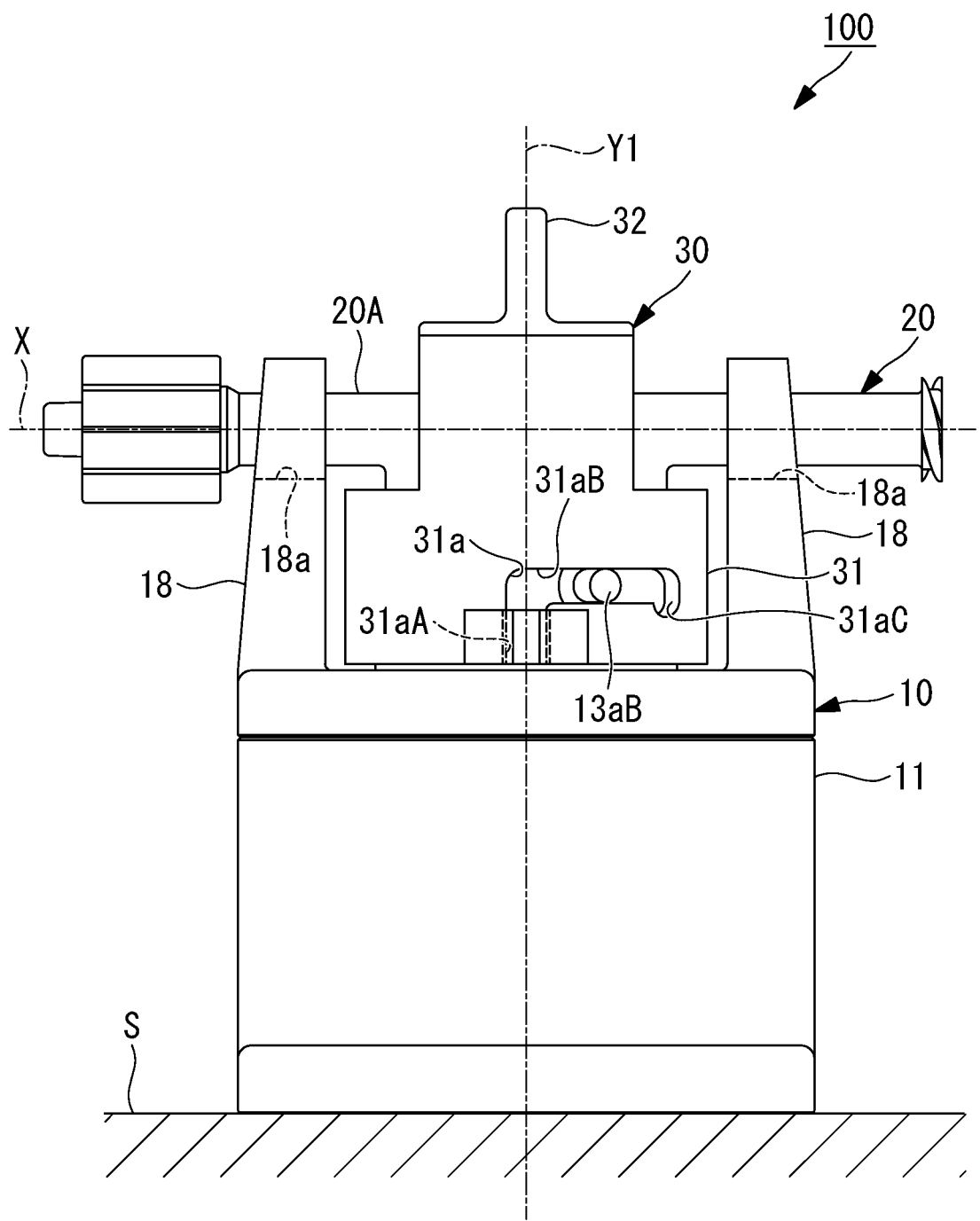
FIG. 7 is a front view illustrating the pressure detection device during the mounting unit being rotated from a release position to a lock position.

FIG. 7 is a front view illustrating the pressure detection device 100 during the mounting unit 30 being rotated from a release position to a lock position. In the state illustrated in FIG. 7, even if the operator reduces the force to press the knob 32 downward or releases the knob 32, the mounting unit 30 to which upward urging force is applied by the urging unit 14 is restricted from moving upward in the direction of the first axis Y1. This is because the second groove 31aB comes into contact with the protrusion 13aB even if the mounting unit 30 is forced to move upward by the urging force of the urging unit 14.

Figure 8:
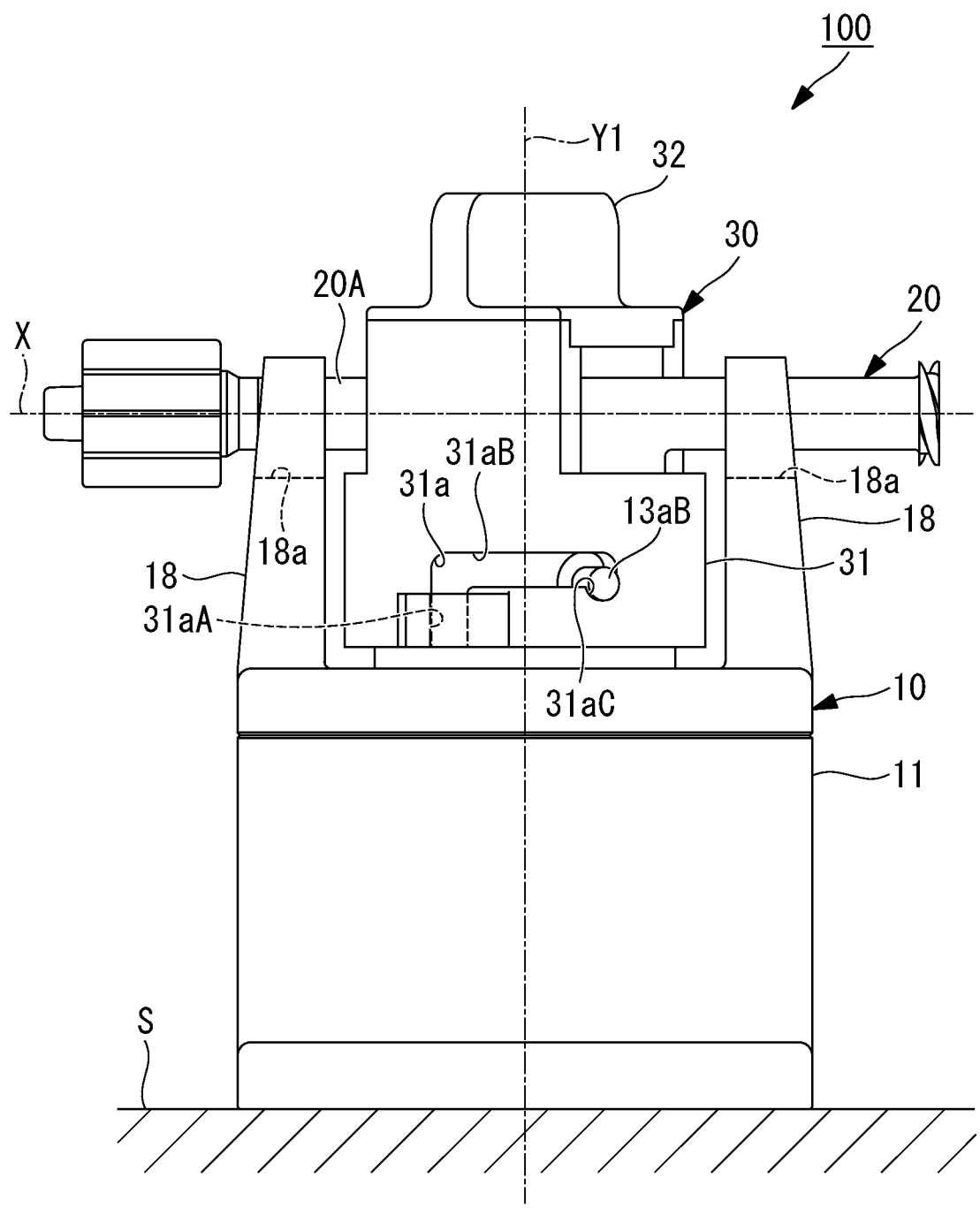
FIG. 8 is a front view illustrating a pressure detection device in a state where the mounting unit has been rotated to a lock position.

Next, the operator rotates the knob 32 clockwise circumferentially about the second axis Y2 while gripping the knob 32 in the state illustrated in FIG. 7 and presses the recess 31aC arranged at the end of the second groove 31aB against the protrusion 13aB into a state illustrated in FIG. 8. As illustrated in FIG. 8, the recess 31aC is formed in a shape recessed downward along the first axis Y1 from the second groove 31aB and corresponding to the outer circumferential surface of the protrusion 13aB.

Figure 9:
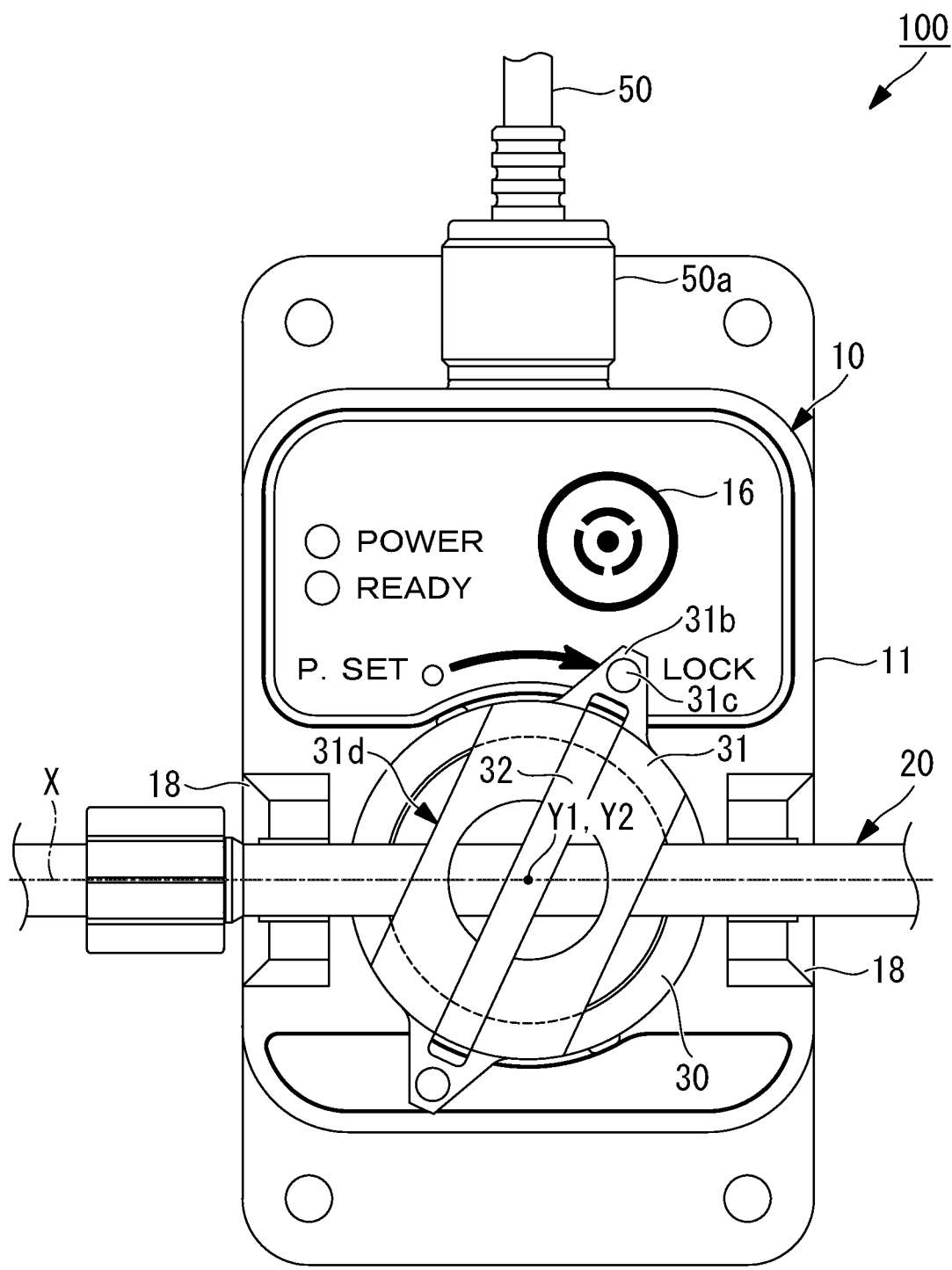
FIG. 9 is a plan view of the pressure detection device illustrated in FIG. 8.
Figure 10:
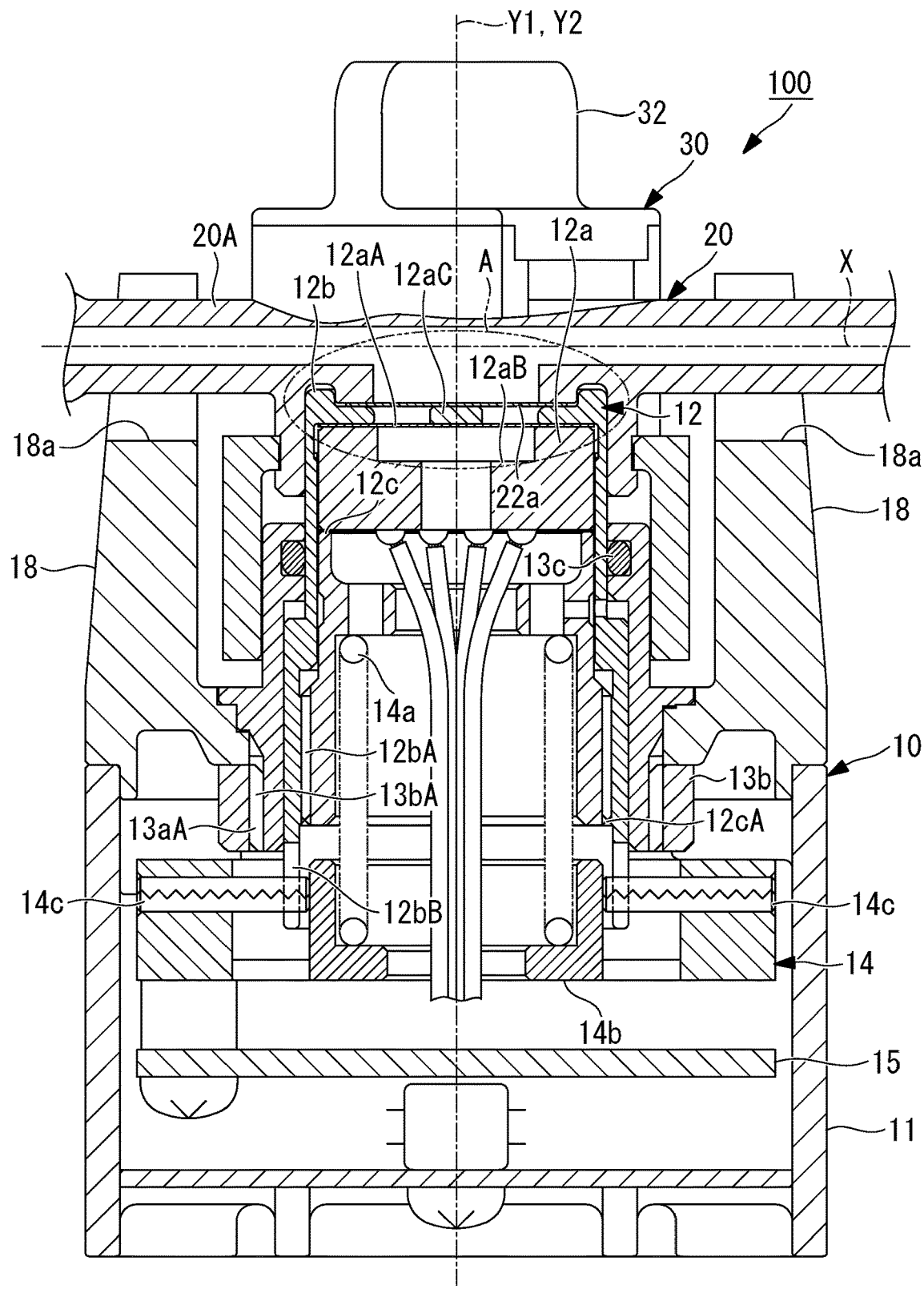
FIG. 10 is a longitudinal sectional view of the pressure detection unit illustrated in FIG. 8.

FIG. 8 is a front view illustrating the pressure detection device 100 after the mounting unit 30 has been rotated to the lock position. FIG. 9 is a plan view of the pressure detection device 100 illustrated in FIG. 8. FIG. 10 is a longitudinal sectional view of the pressure detection device 100 illustrated in FIG. 8.

As illustrated in FIG. 8, in a state where the mounting unit 30 has been rotated to the lock position, the recess 31aC of the second groove 31aB is pressed against the protrusion 13aB by the urging force generated by the urging unit 14, and thereby the sensor unit 12 is positioned at a predetermined position on the second axis Y2.

Further, the mounting unit 30 is restricted from rotating about the second axis Y2 when the recess 31aC is pressed against the protrusion 13aB by the urging force generated by the urging unit 14. This is because, once the recess 31aC is pressed against the protrusion 13aB, unless the operator applies pressing force to press the knob 32 downward, the knob 32 is unable to be rotated anticlockwise.

In the above description, the operation to mount the flow passage unit 20 on the pressure detection unit 10 by rotating the mounting unit 30 from the release position to the lock position has been illustrated. An operation to remove the flow passage unit 20 from the pressure detection unit 10 will be an operation to rotate the mounting unit 30 from the lock position to the release position.

When removing the flow passage unit 20 from the pressure detection unit 10, the operator presses the knob 32 downward to separate the recess 31aC from the protrusion 13aB and rotates the knob 32 anticlockwise into the state illustrated in FIG. 7. The operator further rotates the knob 32 anticlockwise into the state illustrated in FIG. 6. The operator then pulls the mounting unit 30 upward while dripping the knob 32 and thereby separates the flow passage unit 20 from the pressure detection unit 10.

Figure 11:
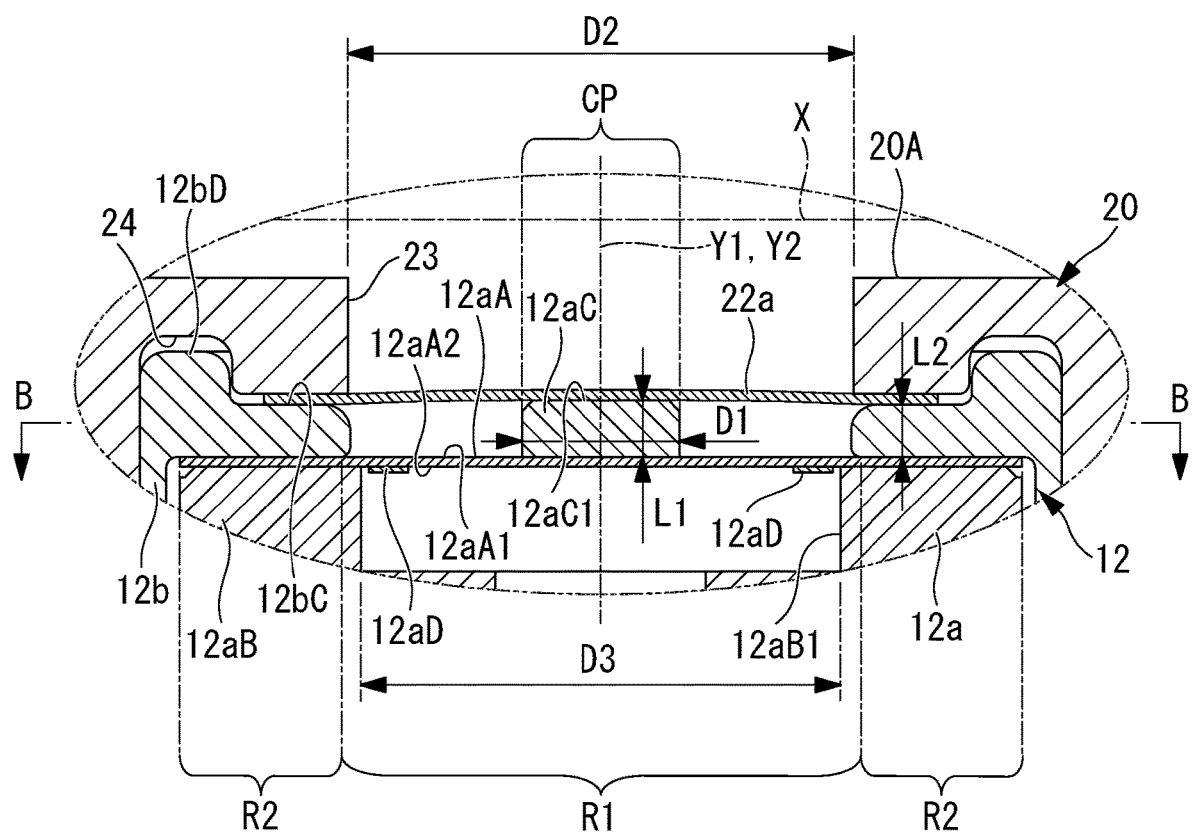
FIG. 11 is a partial enlarged view of a part A of the pressure detection device illustrated in FIG. 10 and illustrates a state where a pressure detecting diaphragm is not pressurized.
Figure 12:
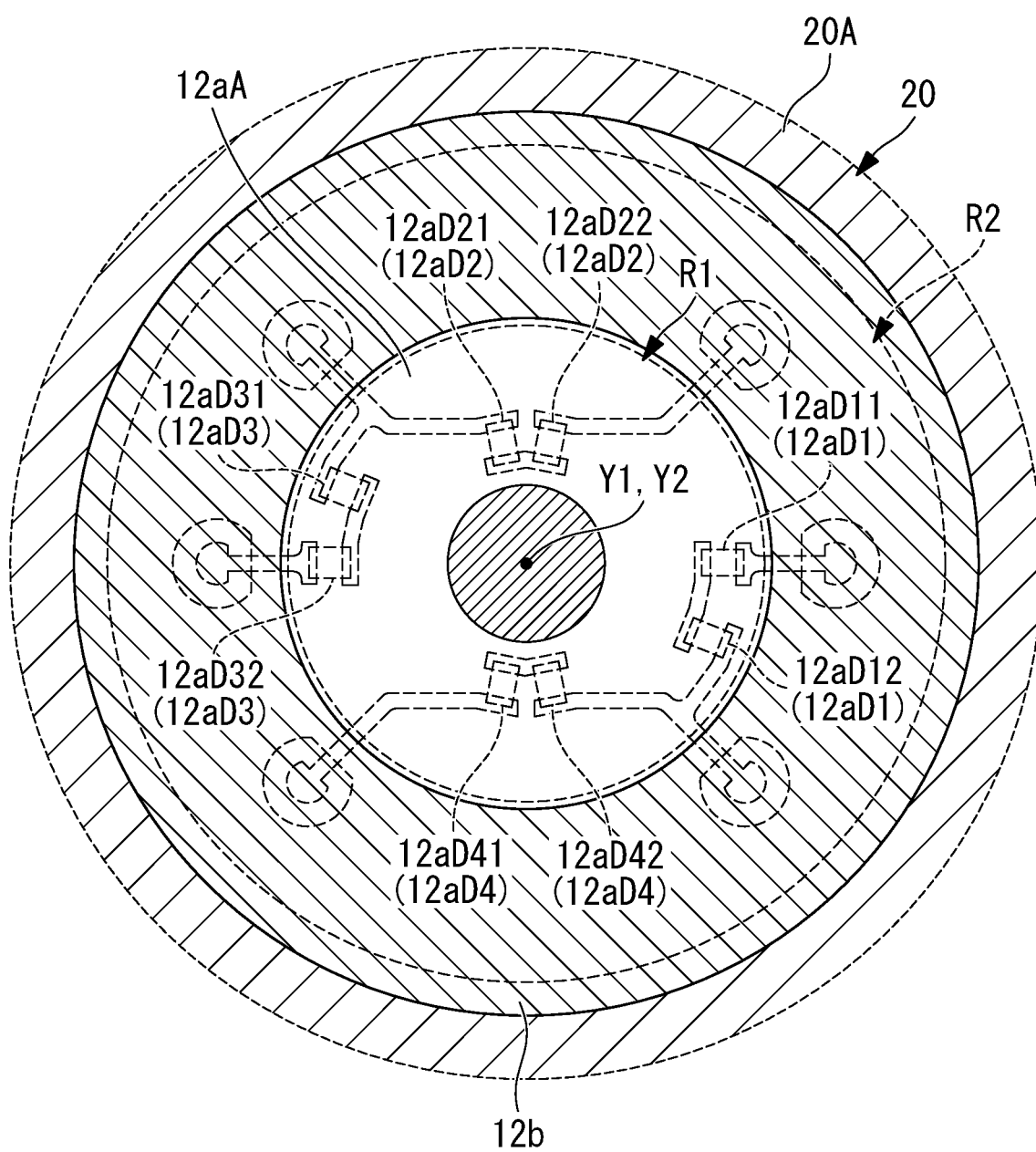
FIG. 12 is a sectional view on arrow B-B of the pressure detection device illustrated in FIG. 11.

Next, the structure for transmitting a pressure of a fluid from the flow passage diaphragm 22a to the pressure detecting diaphragm 12aA will be described with reference to FIG. 11 to FIG. 14. FIG. 11 is a partial enlarged view of a part A of the pressure detection device 100 illustrated in FIG. 10 and illustrates a state where the pressure detecting diaphragm 12aA is not pressurized. FIG. 12 is a sectional view on arrow B-B of the pressure detection device 100 illustrated in FIG. 11.

Figure 13:
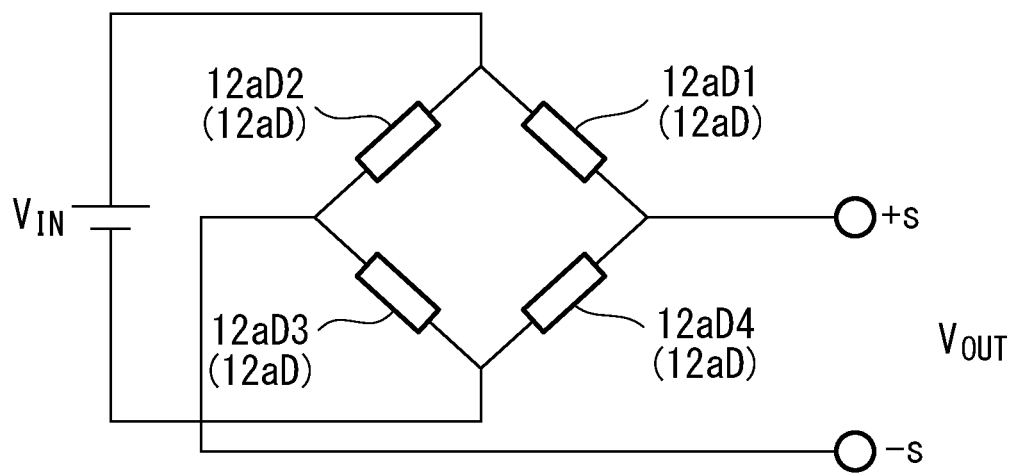
FIG. 13 is a diagram illustrating a Wheatstone bridge circuit formed of four distortion resistor units connected by metal wirings.
Figure 14:
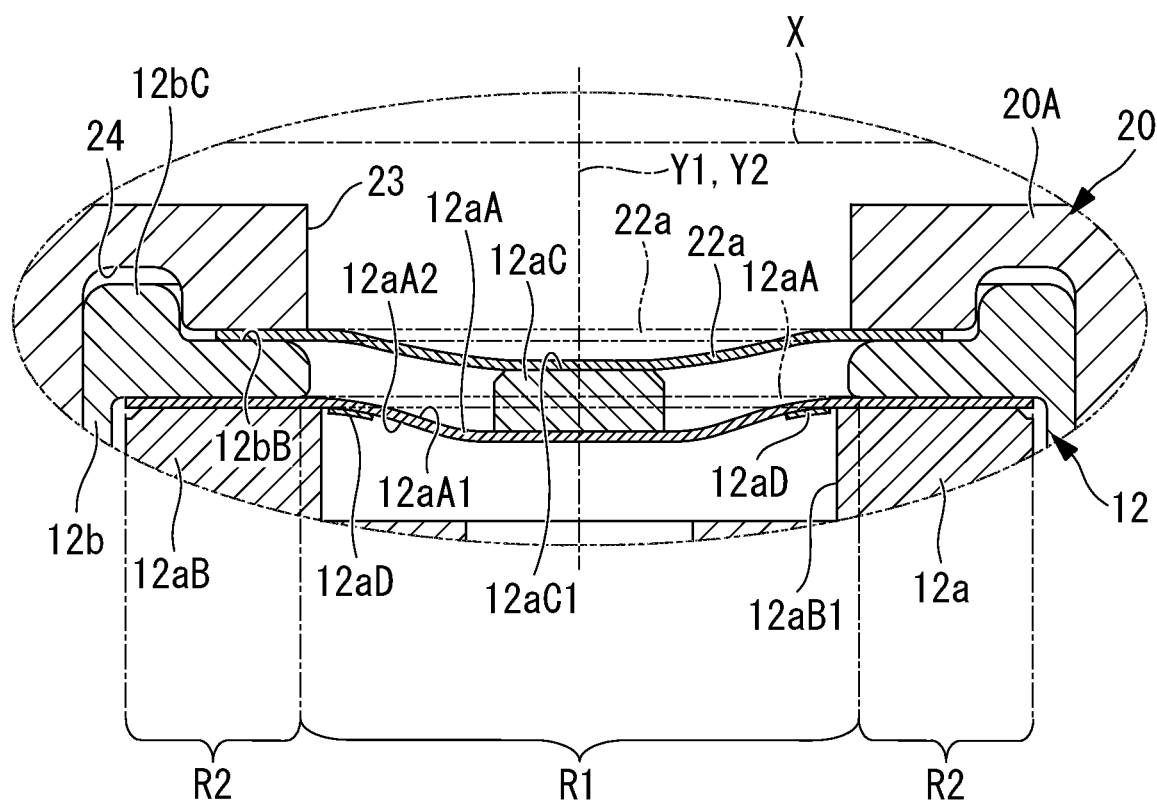
FIG. 14 is a partial enlarged view of a part A of the pressure detection device illustrated in FIG. 10 and illustrates a state where a pressure detecting diaphragm is pressurized.

FIG. 13 is a diagram illustrating a Wheatstone bridge circuit formed of four distortion resistor units connected by metal wirings. FIG. 14 is a partial enlarged view of a part A of the pressure detection device illustrated in FIG. 10 and illustrates a state where the pressure detecting diaphragm 12aA is pressurized. In FIG. 14, the pressure detecting diaphragm 12aA and the flow passage diaphragm 22a in a state where the pressure detecting diaphragm 12aA is not pressurized are depicted by virtual lines.

The state where the pressure detecting diaphragm 12aA is not pressurized refers to a state where no fluid flows through the flow passage 21 and the flow passage 21 is maintained at the atmospheric pressure or a state where the pressure of a fluid flowing through the flow passage 21 matches the atmospheric pressure. The state where the pressure detecting diaphragm 12aA is pressurized refers to a state where the pressure of a fluid flowing through the flow passage 21 is higher than the atmospheric pressure.

As illustrated in FIG. 11 and FIG. 14, the sensor rod 12aC of the sensor body 12a is a member arranged at the center part CP of a first surface 12aA1 of the pressure detecting diaphragm 12aA. The sensor rod 12aC protrudes toward the flow passage diaphragm 22a of the flow passage unit 20 along the first axis Y1 orthogonal to the pressure detecting diaphragm 12aA, and a top surface 12aC1 orthogonal to the first axis Y1 is formed thereto. The sensor rod 12aC is formed of glass, for example, and joined to the center part CP of the pressure detecting diaphragm 12aA by an adhesive agent.

The reason why glass is used for the sensor rod 12aC is that glass has substantially the same mechanical property and thermal property as the material forming the pressure detecting diaphragm 12aA (for example, sapphire). When the mechanical property and the thermal property of the sensor rod 12aC are substantially the same as those of the pressure detecting diaphragm 12aA, it is possible to suppress a reduction in detection accuracy due to the mechanical property and the thermal property of the sensor rod 12aC that would otherwise occur.

Further, when the sensor rod 12aC and the pressure detecting diaphragm 12aA are made of substantially the same material, adhesiveness of both the components to an adhesive agent can be improved. Note that the sensor rod 12aC and the pressure detecting diaphragm 12aA may be formed of the same material or the same type of glass and joined by an adhesive agent. Further, the sensor rod 12aC and the pressure detecting diaphragm 12aA may be integrally formed of the same material.

As illustrated in FIG. 11 and FIG. 14, the displacement of the flow passage diaphragm 22a in contact with the top surface 12aC1 of the sensor rod 12aC is transmitted to the pressure detecting diaphragm 12aA via the sensor rod 12aC in a state where the flow passage unit 20 has been mounted on the pressure detection unit 10 by the mounting unit 30.

As illustrated in FIG. 11 and FIG. 14, the end of the housing member 12b on the flow passage unit 20 side is in contact with the second region R2 on the outer circumference side of the first region R1 in a state where the first region R1 including the center part CP of the pressure detecting diaphragm 12aA is exposed. As illustrated in FIG. 12, the first region R1 is a circular region about the first axis Y1, and the second region R2 is an annular region about the first axis Y1.

As illustrated in FIG. 11 and FIG. 14, the housing member 12b has a contact surface 12bC in contact with the end region of the flow passage diaphragm 22a in a state where the flow passage unit 20 has been mounted on the pressure detection unit 10 by the mounting unit 30. When the flow passage diaphragm 22a comes into contact with the contact surface 12bC, the position on the first axis Y1 is fixed relatively to the pressure detecting diaphragm 12aA.

As illustrated in FIG. 11, the length along the first axis Y1 from the first surface 12aA1 to the top surface 12aC1 of the pressure detecting diaphragm 12aA is denoted as a first length L1, and the length along the first axis Y1 from the first surface 12aA1 to the contact surface 12bC is denoted as a second length L2. The first length L1 is set to be 1.0 time or greater and 1.3 times or less of the second length L2.

As illustrated in FIG. 11, the outer diameter of the sensor rod 12aC is denoted as D1, and the inner diameter of the communication hole 23 is denoted as D2. The outer diameter D1 is set to be 0.2 times or greater and 0.6 times or less of the inner diameter D2. Further, the inner diameter of the opening hole 12aB1 formed in the base part 12aB of the sensor body 12a is denoted as D3. The outer diameter D1 is set to be 0.2 times or greater and 0.5 times or less of the inner diameter D3.

As illustrated in FIG. 11 and FIG. 14, an annular protrusion 12bD protruding to the flow passage unit 20 side from the contact surface 12bC is formed to the end of the housing member 12b. The annular protrusion 12bD is formed annularly about the first axis Y1. Further, the annular groove 24 is formed at a position facing the annular protrusion 12bD of the flow passage body 20A. The width of the annular groove 24 (the length in the direction orthogonal to the second axis Y2) is slightly wider than the width of the annular protrusion 12bD.

When the sensor unit 12 is urged in the direction approaching the flow passage unit 20 by the urging unit 14, the annular protrusion 12bD is inserted in the annular groove 24 before the flow passage diaphragm 22a comes into contact with the top surface 12aC1 of the sensor rod 12aC. The annular protrusion 12bD is inserted in the annular groove 24, and thereby the first axis Y1 of the pressure detection unit 10 matches the second axis Y2 of the flow passage unit 20.

Thus, when the flow passage diaphragm 22a comes into contact with the top surface 12aC1 of the sensor rod 12aC, the first axis Y1 of the pressure detection unit 10 matches the second axis Y2 of the flow passage unit 20. Accordingly, it is prevented that, after the flow passage diaphragm 22a comes into contact with the top surface 12aC1 of the sensor rod 12aC, the flow passage diaphragm 22a and the top surface 12aC1 are shifted in a direction orthogonal to the first axis Y1 and thereby the pressure detection characteristics vary.

The distortion resistor unit 12aD joined to the second surface 12aA2 of the pressure detecting diaphragm 12aA will be described here. Since FIG. 12 is a diagram of the pressure detecting diaphragm 12aA when viewed from the first surface 12aA1 side, four distortion resistor units 12aD (12aD1, 12aD2, 12aD3, 12aD4) joined to the second surface 12aA2 of the pressure detecting diaphragm 12aA are depicted by virtual lines.

As illustrated in FIG. 12, the distortion resistor unit 12aD1 has two elements of the distortion resistor element 12aD11 and the distortion resistor element 12aD12 arranged at circumferentially different positions about the center part CP. Similarly, the distortion resistor unit 12aD2 has two elements of the distortion resistor element 12aD21 and the distortion resistor element 12aD22 arranged at circumferentially different positions about the center part CP. Similarly, the distortion resistor unit 12aD3 has two elements of the distortion resistor element 12aD31 and the distortion resistor element 12aD32 arranged at circumferentially different positions about the center part CP. Similarly, the distortion resistor unit 12aD4 has two elements of the distortion resistor element 12aD41 and the distortion resistor element 12aD42 arranged at circumferentially different positions about the center part CP.

As illustrated in FIG. 12, the four distortion resistor units 12aD of the present embodiment are arranged in regions except for the center part CP at which the sensor rod 12aC is arranged in the first region R1 of the second surface 12aA2 of the pressure detecting diaphragm 12aA. The reason why the four distortion resistor units 12aD are arranged in regions except for the center part CP is that the center part CP is hardly displaced even when a pressure is transmitted from the sensor rod 12aC to the pressure detecting diaphragm 12aA. The reason why the center part CP is hardly displaced is that the center part CP of the second surface 12aA2 of the pressure detecting diaphragm 12aA is joined to the sensor rod 12aC by an adhesive agent.

As illustrated in FIG. 13, the resistances of the four distortion resistor units 12aD change in accordance with the displacement (distortion) of the pressure detecting diaphragm 12aA caused by a pressure transmitted to the pressure detecting diaphragm 12aA. When a pressure is transmitted to the pressure detecting diaphragm 12aA and the resistances of the four distortion resistor units 12aD change, the value of the output voltage Vout to the input voltage Vin changes. This value of the output voltage Vout is converted into the pressure of a fluid by the sensor board 15.

The pressure detection device 100 according to this embodiment provides the following effects.

In the pressure detection device 100 according to this embodiment, the flow passage unit 20 is removably mounted on the pressure detection unit 10. When fluid flowing through the flow passage 21 is changed, the used flow passage unit 20 can be removed from the pressure detection unit 10 to mount a new unused one on the pressure detection unit 10. Consequently, there is no need to perform time-consuming cleaning of the flow passage 21 when fluid flowing through the flow passage 21 is changed, thereby enabling prompt work. Further, use of the new unused flow passage unit 20 can improve safety.

Further, according to the pressure detection device 100 of the present embodiment, the displacement of the flow passage diaphragm 22a in contact with the top surface 12aC1 of the sensor rod 12aC arranged at the center part CP of the first surface 12aA1 of the pressure detecting diaphragm 12aA is transmitted to the pressure detecting diaphragm 12aA via the sensor rod 12aC in a state where the flow passage unit 20 has been mounted on the pressure detection unit 10 by the mounting unit 30.

Since the region of the flow passage diaphragm 22a in contact with the top surface 12aC1 of the sensor rod 12aC is a part of the entire region of the flow passage diaphragm 22a, the entire region of the top surface 12aC1 of the sensor rod 12aC reliably comes into contact with the flow passage diaphragm 22a even with individual differences in the shape of flow passage units 20 or variation in work in mounting the flow passage unit 20 on the pressure detection unit 10. It is therefore possible to suppress variation in the pressure detection characteristics of the pressure detection unit 10 from occurring due to individual differences in the shape of flow passage units 20, variation in work in mounting the flow passage unit 20 on the pressure detection unit 10, or the like.

Further, according to the pressure detection device 100 of the present embodiment, since the pressure detection unit 10 has the sensor rod 12aC arranged at the center part CP of the first surface 12aA1 of the pressure detecting diaphragm 12aA, the shape of the sensor rod 12aC does not change even after the flow passage unit 20 is replaced. It is therefore possible to prevent variation of the pressure detection characteristics due to individual differences in the shape of the sensor rods 12aC compared to a case where the sensor rod 12aC is provided to the flow passage unit 20.

Herein, the variation of the pressure detection characteristics means that, for example, when external force is applied to the pressure detection device 100, there is a difference between a pressure detection value before the external force is applied and a pressure detection value after the external force is applied even when the fluid pressure is constant. Further, the variation of the pressure detection characteristics means that, for example, there is a difference between a pressure detection value in a state where the fluid pressure is gradually increasing and a pressure detection value in a state where the fluid pressure is gradually decreasing even with the same fluid pressure.

Further, according to the pressure detection device 100 of the present embodiment, the first length L1 along the first axis Y1 from the first surface 12aA1 of the pressure detecting diaphragm 12aA to the top surface 12aC1 of the sensor rod 12aC is 1.0 time or greater of the second length L2 from the first surface 12aA1 to the contact surface 12bC of the housing member 12b. Thus, the top surface 12aC1 of the sensor rod 12aC is arranged at the same position as the contact surface 12bC of the housing member 12b or at a position protruding therefrom to the flow passage diaphragm 22a, and the entire region of the top surface 12aC1 can be in reliably contact with the flow passage diaphragm 22a.

Further, according to the pressure detection device 100 of the present embodiment, the first length L1 is 1.3 times or less of the second length L2. This suppresses the top surface 12aC1 of the sensor rod 12aC from excessively protruding to the flow passage diaphragm 22a from the contact surface 12bC of the housing member 12b, and it is possible to prevent variation of the pressure detection characteristics due to excessive deformation of the flow passage diaphragm 22a.

Further, according to the pressure detection device 100 of the present embodiment, the four distortion resistor units 12aD are joined to a region except for the center part CP of the second surface 12aA2 of the pressure detecting diaphragm 12aA. It is therefore possible to suppress a reduction in the pressure detection accuracy compared to a case where the distortion resistor unit 12aD is arranged at the center part CP of the pressure detecting diaphragm 12aA whose displacement is suppressed because the sensor rod 12aC is arranged.

Further, according to the pressure detection device 100 of the present embodiment, the outer diameter D1 of the sensor rod 12aC is 0.2 times or greater of the inner diameter D2 of the communication hole 23 of the flow passage unit 20. It is therefore possible to sufficiently secure the outer diameter D1 of the sensor rod 12aC relative to the inner diameter D2 of the communication hole 23 and reliably transmit a pressure change of a fluid flowing through the flow passage 21 to the pressure detecting diaphragm 12aA.

Further, according to the pressure detection device 100 of the present embodiment, the outer diameter D1 of the sensor rod 12aC is 0.6 times or less of the inner diameter D2 of the communication hole 23 of the flow passage unit 20. Thus, even with individual differences in the shape of flow passage units 20 or variation in work in mounting the flow passage unit 20 on the pressure detection unit, the entire region of the top surface 12aC1 of the sensor rod 12aC can be in reliably contact with the flow passage diaphragm 22a.

According to the pressure detection device 100 of the present embodiment, the outer diameter D1 of the sensor rod 12aC is 0.2 times or greater of the inner diameter D3 of the opening hole 12aB1 of the base part 12aB. It is therefore possible to sufficiently secure the outer diameter D1 of the sensor rod 12aC relative to the inner diameter D3 of the opening hole 12aB1 and reliably displace the pressure detecting diaphragm 12aA in accordance with the pressure transmitted from the sensor rod 12aC.

Further, according to the pressure detection device 100 of the present embodiment, the outer diameter D1 of the sensor rod 12aC is 0.5 times or less of the inner diameter D3 of the opening hole 12aB1 of the base part 12aB. It is therefore possible to sufficiently secure the region of the pressure detecting diaphragm 12aA where the sensor rod 12aC is not arranged and sufficiently secure the displacement of the pressure detecting diaphragm 12aA.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A pressure detection device comprising:
a pressure detection unit configured to detect a pressure of a fluid;
a flow passage unit in which a flow passage through which the fluid flows is formed; and
a mounting unit configured to removably mount the flow passage unit on the pressure detection unit,
wherein the pressure detection unit includes:
a pressure detecting diaphragm configured to be displaced in accordance with a pressure transmitted from the flow passage unit, and
a pressure transmitting member arranged at a center part of a first surface of the pressure detecting diaphragm, protruding toward the flow passage unit along a first axis orthogonal to the pressure detecting diaphragm, and having a top surface orthogonal to the first axis,
wherein the flow passage unit includes:
a flow passage diaphragm configured to be displaced in accordance with a pressure of the fluid flowing through the flow passage, and
a cylindrical communication hole extending along a second axis orthogonal to the flow passage and communicating with the flow passage, the communication hole being closed by the flow passage diaphragm,
wherein a displacement of the flow passage diaphragm in contact with the top surface is transmitted to the pressure detecting diaphragm via the pressure transmitting member in a state where the flow passage unit is mounted on the pressure detection unit by the mounting unit, and
wherein the outer diameter of the pressure transmitting member is 0.2 times or greater and 0.6 times or less of the inner diameter of the communication hole.

2. The pressure detection device according to claim 1, wherein the pressure detection unit includes
a sensor body having the pressure detecting diaphragm, the pressure transmitting member, and a base part to which the pressure detecting diaphragm is attached, and
a housing member configured to house the sensor body and, in a state where a first region including the center part of the pressure detecting diaphragm is exposed, come into contact with a second region located on the outer circumference side of the first region,
wherein the housing member has a contact surface in contact with an end region of the flow passage diaphragm in a state where the flow passage unit is mounted on the pressure detection unit by the mounting unit, and
wherein a first length along the first axis from the first surface to the top surface is 1.0 time or greater and 1.3 times or less of a second length along the first axis from the first surface to the contact surface.

3. The pressure detection device according to claim 2, wherein the base part has a cylindrical opening hole extending along the first axis,
wherein the opening hole is closed by the pressure detecting diaphragm, and
wherein the outer diameter of the pressure transmitting member is 0.2 times or greater and 0.5 times or less of the inner diameter of the opening hole.

4. The pressure detection device according to claim 1, wherein the pressure detection unit has four distortion resistor units joined to a second surface of the pressure detecting diaphragm and connected to form a Wheatstone bridge circuit, and
wherein the four distortion resistor units are joined to a region of the second surface except for the center part.

5. The pressure detection device according to claim 1,
wherein the pressure detection unit has a urging unit configured to generate urging force to urge the pressure detecting diaphragm toward the flow passage diaphragm along the first axis, and
wherein the mounting unit mounts the flow passage unit on the pressure detection unit in a state where the top surface of the pressure transmitting member is in contact with the flow passage diaphragm under the urging force generated by the urging unit.

* * * * *